United States Patent
Zheng et al.

(10) Patent No.: US 8,483,123 B2
(45) Date of Patent: Jul. 9, 2013

(54) QOS REQUEST AND INFORMATION DISTRIBUTION FOR WIRELESS RELAY NETWORKS

(75) Inventors: Haihong Zheng, Coppell, TX (US); Yousuf Saifullah, Richardson, TX (US)

(73) Assignee: Nokia Corporation, Espoo (FI)

( * ) Notice: Subject to any disclaimer, the term of this patent is extended or adjusted under 35 U.S.C. 154(b) by 832 days.

(21) Appl. No.: 11/479,976

(22) Filed: Jun. 30, 2006

(65) Prior Publication Data

US 2008/0002608 A1    Jan. 3, 2008

(51) Int. Cl.
*H04W 4/00* (2009.01)
*H04L 12/28* (2006.01)
*G01R 31/08* (2006.01)

(52) U.S. Cl.
USPC ............ 370/328; 370/252; 370/351; 370/400

(58) Field of Classification Search
USPC ...................................................... 370/359.3
See application file for complete search history.

(56) References Cited

U.S. PATENT DOCUMENTS

| | | | |
|---|---|---|---|
| 6,954,435 B2 * | 10/2005 | Billhartz et al. ............. | 370/252 |
| 2003/0202469 A1 | 10/2003 | Cain | |
| 2004/0242154 A1 | 12/2004 | Takeda et al. | |
| 2006/0028986 A1 * | 2/2006 | Kwon et al. .................. | 370/230 |
| 2006/0039313 A1 * | 2/2006 | Chou et al. ................... | 370/328 |
| 2007/0097945 A1 * | 5/2007 | Wang et al. .................. | 370/349 |
| 2007/0116051 A1 * | 5/2007 | Chen ............................ | 370/328 |
| 2007/0211726 A1 * | 9/2007 | Kuang et al. ............... | 370/395.3 |
| 2009/0141661 A1 | 6/2009 | Li et al. | |

FOREIGN PATENT DOCUMENTS

| | | |
|---|---|---|
| AU | 2007270867 A1 | 1/2008 |
| GB | 2411549 | 8/2005 |
| JP | 2005-524315 A | 8/2005 |
| JP | 2005-524336 A | 8/2005 |
| WO | 03/094025 A1 | 11/2003 |
| WO | 03/094404 A2 | 11/2003 |
| WO | 2006/060239 A1 | 6/2006 |
| WO | 2008/004059 A2 | 1/2008 |
| WO | 2008004059 A2 | 1/2008 |
| WO | 2008004059 A3 | 1/2008 |

OTHER PUBLICATIONS

Admission Control with Load Balancing in IEEE 802.11-Based ESS Mesh Networks, Dongmei Zhao, Jun Zou and Terence D. Todd, c. 2005 http://ieeexplore.ieee.org/stamp/stamp.jsp?tp=&arnumber=1551071&isnumber=33050.*

(Continued)

*Primary Examiner* — Charles Appiah
*Assistant Examiner* — Natasha Cosme
(74) *Attorney, Agent, or Firm* — Squire Sanders (US) LLP

(57) ABSTRACT

Various embodiments are described relating to wireless networks, such as quality of service (QoS) request and information distribution for wireless relay networks. According to an example embodiment, a technique or method may include receiving a QoS-related message at a relay station in a wireless relay network. The QoS-related message may include one or more QoS parameters for a flow. The method or technique may also include retrieving, at the relay station, the QoS parameters from the QoS-related message to use the QoS parameters subsequently for admission control and/or scheduling for the flow. Other example embodiments are described.

30 Claims, 10 Drawing Sheets

OTHER PUBLICATIONS

"802.16 IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands", IEEE Std 802.16, (Feb. 28, 2006).

Braden, R. et al., "RFC 2205—Resource Reservation Protocol (RSVP)—Version 1 Functional Specification", https://www.faqs.org/rfcs2205.html,Introduction,(Sep. 1997) 112 pgs.

First Examiner Report for Australian Application No. 2007270867, mailed on Feb. 5, 2010, 1 page.

"Coexistence of Fixed Broadband Wireless Access Systems", IEEE Recommended Practice for Local and Metropolitan Area Networks, IEEE Std. 802.16.2-2004, Mar. 17, 2004, 169 pages.

"Part 16: Air Interface for Fixed Broadband Wireless Access Sytems", IEE Standard for Local and Metropolitan Area Networks, IEEE Std. 802.16-2004 (Revision of IEEE Std. 802.16-2001), Oct. 1, 2004, 895 pages.

Chung, S., et al, "Understanding the MAC Impact of 802.11e: Part 2", CommsDesign, Oct. 30, 2003, 7 pages.

Godfrey, T., "Inside 802.11e: Making QoS a Reality Over WLAN Connections", CommsDesign, Dec. 19, 2003, 11 pages.

"Part 16: Air Interface for Fixed Broadband Wireless Access Sytems; Amendment 2: Physical and Medium Access Control Layers for Combined Fixed and Mobile Operation in Licensed Bandes; and Corrigendum 1", IEE Standard for Local and Metropolitan Area Networks, IEEE Std. 802.16e-2005 and IEEE Std. 802.16-2001/Cor1-2005 (Amendment and Corrigendum to IEEE Std. 802.16-2004), Feb. 28, 2006, 864 pages.

Yu, James, "IEEE 802.11e QoS for Wireless LAN: A Research Direction", TDC Network Seminar, Dec. 9, 2003, 26 pages.

Office Action for KR Application No. 2008-7031787 (including English Translation), mailed Oct. 14, 2010, 14 pages.

Office Action for Chinese Application No. 200780025044.8 (with English Translation), mailed Jan. 27, 2011, 33 pages.

Zhao, et al "Admission Control with Load Balancing in IEEE 802.11-Based ESS Mesh Networks", IEEE Computer Society, Proceedings of the Second International Conference on Quality of Service in Heterogeneous Wired/Wireless Networks, Dec. 12, 2005, 8 pages.

Office Action for Japanese Patent Application No. 2009-517468 (with English Translation), mailed on Jul. 25, 2011, 6 pages.

Substantive Adverse Examination Report for Malaysian Patent Application No. PI 20085071, mailed on Jun. 30, 2011, 2 pages.

Office Action for Chinese Application No. 200780025044.8 (with English Translation), mailed Jul. 14, 2011, 38 pages.

Office Action Received for Japanese Patent Application No. 2009-517468, mailed on Dec. 16, 2011, 4 pages including 2 pages of English Translation.

Final Office Action received for Chinese Patent Application No. 200780025044.8, mailed on Nov. 25, 2011, 15 pages.

International Preliminary Report on Patentability received for International Patent Application No. PCT/IB2007/001776, mailed on Jan. 15, 2009, 9 pages.

International Search Report and Written Opinion received for International Patent Application No. PCT/IB2007/001776, mailed on Feb. 5, 2008, 13 pages.

Office Action Response filed for Chinese Patent Application No. 200780025044.8, filed on May 26, 2011, 12 pages.

Office Action Response filed for Chinese Patent Application No. 200780025044.8, Filed on Sep. 27, 2011, 13 pages.

Office Action Response filed for Indonesian Patent Application No. W00200804095, filed on Nov. 18, 2011, 2 pages including 1 page of English Translation.

Application Serial No. 2009-517468, Office Action mailed Dec. 16, 2011.

Application Seial No. 10-2008-7031787, Notice of Allowance mailed Dec. 2, 2011.

Office Action received for the Indonesian Patent Application Serial No. W-00 2008 04095, mailed on Aug. 19, 2011, 6 pages including 3 pages of English Translation.

Office action received for the Philippines Patent Application Serial No. 12008502837, mailed on Oct. 4, 2011, 2 pages.

Office Action for Korean Application No. 2008-7031787 (with English Translation), mailed Apr. 20, 2011, 4 pages.

Israel Office Action, dated Apr. 18, 2012; Issued on corresponding Application No. 195927.

Supplemental Search Report in European Application No. 07766593.3-1249, dated Mar. 26, 2012.

"802.16 IEEE Standard for Local and Metropolitan Area Networks, Part 16: Air Interface for Fixed Broadband Wireless Access Systems, Amendment 2: Physical and Medium Access Control Layers for Combined Fixed and Mobile Operation in Licensed Bands ", IEEE Std 802.16, (Feb. 28, 2006).

Zhao, Dongmei. et al., "Admission control with load balancing in IEEE 802.11-based ESS mesh networks", Quality of Service in Heterogeneous Wired/Wireless Networks, 2005. Second International Conference, (Aug. 22, 2005), 8 pgs.

Braden, R. et al., "RFC 2205—Resource Reservation Protocol (RSVP)—Version 1 Functional Specification", https://www.faqs.org/rfcs2205.html, Instroduction, (Sep. 1997) 112 pgs.

International Search Report for PCT/IB2007/001776 dated May 2, 2008.

* cited by examiner

QOS REQUEST AND INFORMATION DISTRIBUTION FOR WIRELESS RELAY NETWORKS

BACKGROUND

The rapid diffusion of Wireless Local Area Network (WLAN) access and the increasing demand for WLAN coverage is driving the installation of a very large number of Access Points (AP). However, many wireless networks today offer little or no Quality of Service (QoS). While QoS may refer to many different concepts, QoS may, for example, include providing different levels or qualities of service for different types of traffic. QoS may also allow for network resources to be allocated or reserved for certain traffic flows to meet service requirements or QoS requirements for the flow. A number of different parameters may be used to identify a requested QoS or flow requirements, such as, for example, maximum delay or latency, maximum jitter, minimum data rate or bandwidth, or other QoS related parameters. QoS may allow nodes in a wireless network to allocate or prioritize network resources for higher priority traffic flows. However, as wireless networks become more complicated, it becomes increasingly more challenging to provide for QoS for different flows across a network.

SUMMARY

Various embodiments are described relating to wireless networks, such as wireless relay networks, and also relating to quality of service (QoS) request and information distribution for wireless relay networks.

According to an example embodiment, a method or technique may include receiving a quality of service (QoS) request for a flow from a mobile station via one or more relay stations in a wireless relay network, receiving an admission control indication for the flow from one or more relay stations in the network along a path, and making an admission control decision for the flow based at least in part upon the admission control indication(s) from the one or more relay stations.

According to another example embodiment, a technique or method may include receiving a QoS-related message at a relay station in a wireless relay network. The QoS-related message may include one or more QoS parameters for a flow. The method or technique may also include retrieving, at the relay station, the QoS parameters from the QoS-related message to use the QoS parameters subsequently for an admission control decision and/or scheduling for the flow.

According to another example embodiment, a technique or method may include receiving, via one or more relay stations along a path, a QoS request for a flow from a mobile station in a wireless network, sending an admission control request for the flow to the one or more relay stations along the path, receiving an admission control response for the flow from the one or more relay stations in the network, and making an admission control decision for the flow based at least in part upon the admission control response(s) from the one or more relay stations.

According to another example embodiment, a technique or method may include receiving at a base station, via one or more relay stations along a path, a QoS request for a flow from a mobile station in a wireless relay network. The technique or method may also include performing, by the base station, overall admission control for the flow including performing admission control for the flow for the one or more relay stations along the path, and sending, from the base station, an admitted flow indication for the flow to the one or more relay stations along the path.

According to yet another example embodiment, a technique or method may include receiving, at a relay station in a wireless relay network, an admission control request for a flow from a base station. The admission control request may include one or more QoS parameters for the flow. The technique or method may also include performing, by the relay station, local admission control for the flow based on the QoS parameters for the flow, sending, by the relay station, an admission control response for the flow to the base station providing a local admission control decision by the relay station, and receiving at the relay station an admitted flow indication for the flow from the base station.

DETAILED DESCRIPTION

Figure 1:
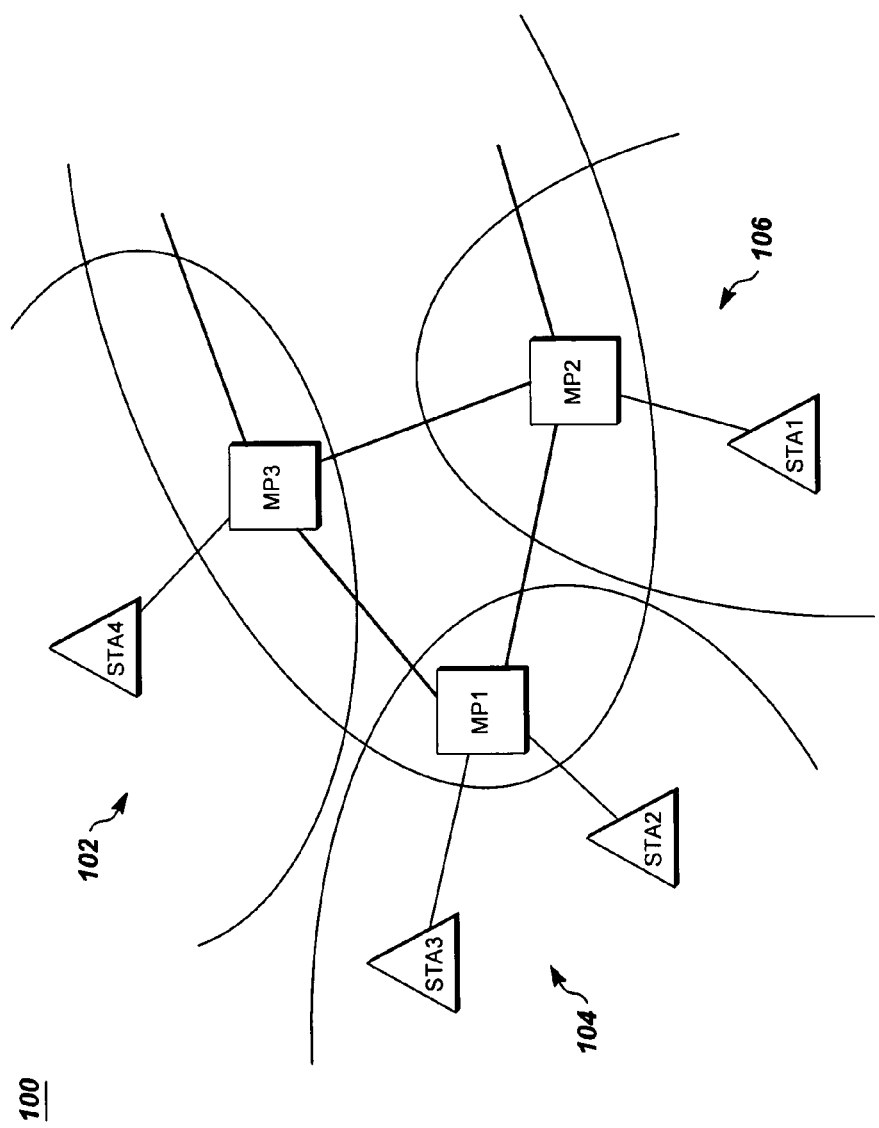
FIG. 1 is a diagram illustrating a wireless network according to an example embodiment.

The various embodiments described herein may be applicable to a wide variety of networks and technologies, such as IEEE 802.11 networks, IEEE 802.16 networks, cellular networks, or other wireless networks. In other example embodiments, although not required, the various examples and embodiments may be applied to an environment, such as a wireless mesh network, where a plurality of mesh points (e.g., Access Points (AP) or base stations (BS)) may be coupled together via wired or wireless links. One or more embodiments described herein may be applicable in ad hoc operation mode, where the stations or nodes may create a network together and communicate directly without an AP. The various embodiments may be applicable to a variety of wireless nodes, including wireless nodes (such as mesh points, stations or STAs), Access Points, base stations, relay station and other types of nodes, and to a variety of networks including wireless networks and wired networks. The term "node" may refer, for example, to a wireless station (STA), an AP or base station, a mesh point, a relay station (or intermediate wireless node), or other wireless computing device, as examples.

In a wireless network, it may be desirable, at least in some cases, to distribute quality of service (QoS)-related information, such as QoS requests, QoS parameters, and the like, to the various nodes, mesh points, APs, etc. to allocate, reserve or manage network resources for the various traffic flows. A flow may include, for example, one or more packets, frames or other data units, e.g., transmitted from a node. There may be one flow associated with a transmitting node. Or, a node may be transmitting multiple flows at the same time, for example. According to an example embodiment, a relay station may retrieve QoS parameters from QoS requests, and/or replies to manage its resources. In another embodiment, the relay stations may send an admission control message to the base station. The admission control information may include resource and other information about the relay station, for example.

According to another embodiment, the base station may send an admission control request to the relay station on a path, and receive an admission control response from the relay station(s). The admission control response may include resource and/or other information that may be used by the base station to manage network resources for one or more flows. According to another embodiment, the base station may send an admitted flow indication to the relay station to inform the relay station(s) of the admitted flow.

In addition, various messages may be protected using an authentication code, such as a keyed-hash message authentication code, or HMAC. A HMAC is a type of message authentication code (MAC) calculated using a cryptographic hash function in combination with a secret key. As with other MACs, the HMAC or other authentication key may be used to simultaneously verify both the data integrity and the authenticity of a message, for example.

FIG. 1 is a diagram illustrating a wireless mesh network 100 according to an example embodiment. In an example embodiment, various embodiments may be applicable to a network, such as a wireless mesh network, for example, as shown in FIG. 1, or other wireless networks. The meshed network 100 is merely an example network, and the various embodiments may apply to a wide variety of wireless networks and systems.

According to an example embodiment, a wireless meshed network may be considered to be a collection of mesh points (MPs) interconnected with wireless or wired links. Each MP may be, for example, an Access Point (AP), base station (BS) or other wireless node. For example, a wireless meshed network may employ either a full mesh topology or a partial mesh topology. In a full mesh topology, each node (or mesh point) may be connected directly to each of the other MPs via a wireless link. In a partial mesh topology, the mesh points may be connected to some but not necessarily all of the other mesh points in the meshed network.

In the example, wireless mesh network 100 illustrated in FIG. 1, mesh points MP1, MP2 and MP3 may be interconnected via wireless links (and/or via wired links). Also, each mesh point may be coupled to one or more wireless stations in its local cell. For example, MP1 is located in cell 104 and is connected via wireless links to stations STA2 and STA3 within cell 104. MP2 is located in cell 106 and is connected via wireless link to station STA1. MP3 is located in cell 102 and is connected via wireless link to station STA4. Network 100 (including MP1, MP2 and MP3) may also be considered a wireless distribution system. Wireless meshed network 100 is merely an example network and the disclosure is not limited thereto. Various embodiments and features described herein may be applicable to a wide variety of wireless networks including WLAN networks, cellular networks and the like.

Figure 10:
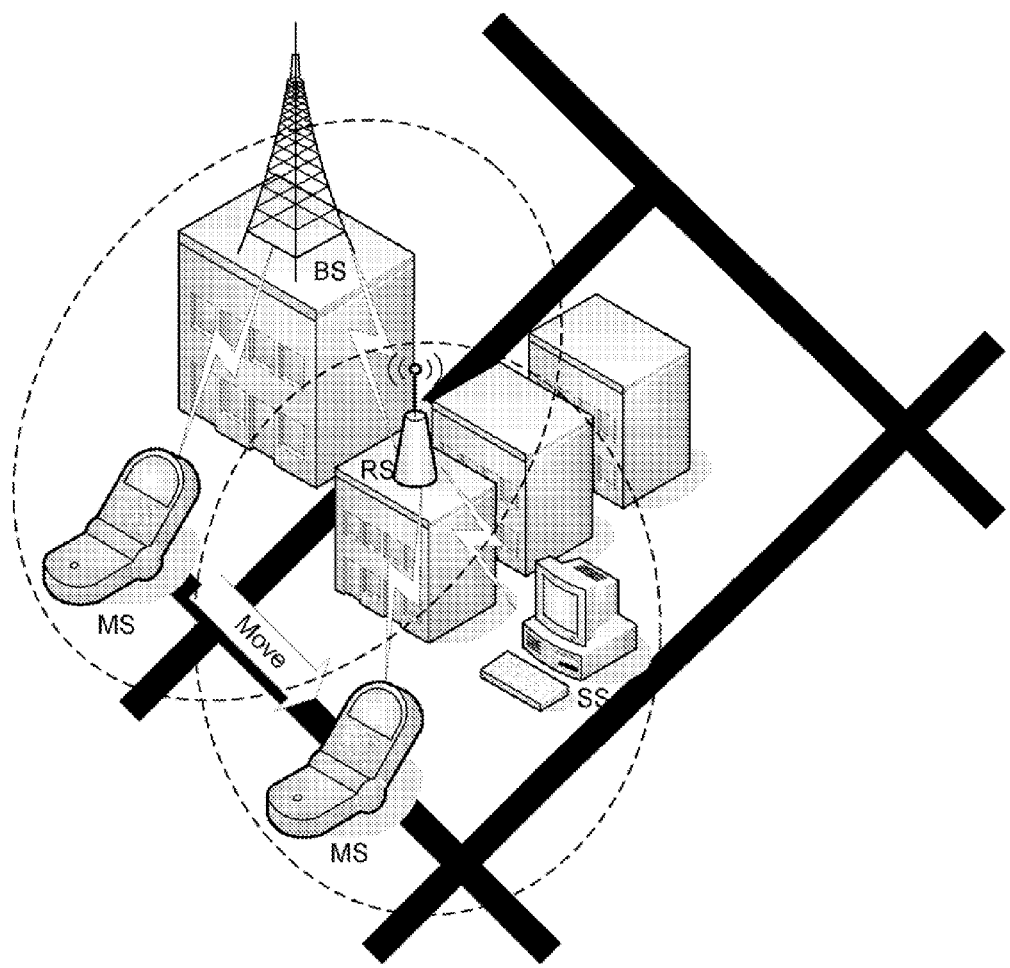
FIG. 10 is a diagram illustrating a wireless relay network according to an example embodiment.

As noted above, a wireless relay network may be another example of a system in which end nodes (MS/SSs) are typically connected to the BS or AP via a Relay Station (RS). FIG. 10 is a diagram illustrating a wireless relay network according to an example embodiment. Typically, traffic between MS/SSs and BS/AP may pass through and may be processed by the RS, for example. For example, a relay station (RS) may be used to extend the network coverage and/or enhance the system throughput. For example, the traffic sent from the RS may be scheduled by the RS itself or scheduled by the BS instead. If scheduled by the RS itself, the BS and RS may for example perform scheduling independently, with the RS receiving and possibly decoding the frame from the BS, and then forwarding the frame to the MS/SS. Although only one RS is shown in the relay network of FIG. 10, a relay network may include any number of relay stations (RSs). For example, two or three relay stations, for example, may be coupled wirelessly along a path between a MS and a BS. One challenge for such relay networks may relate to QoS, such as communicating QoS requests, making QoS or admission control decisions, and communicating admission control decisions or QoS related information to relay stations in the network, for example.

Figure 2:
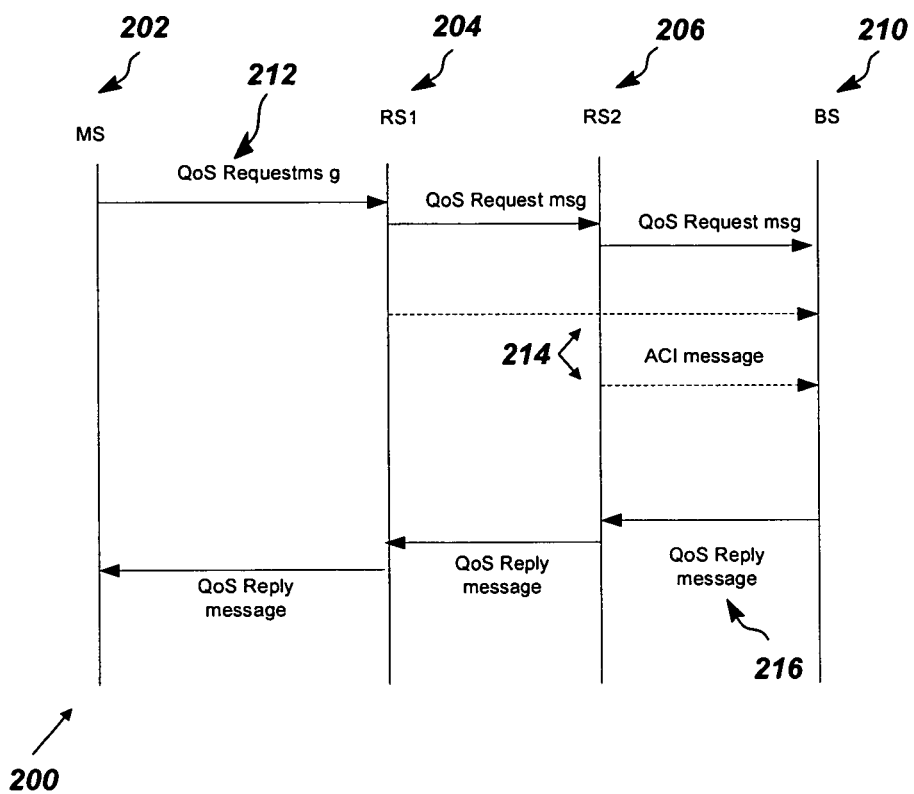
FIG. 2 is a timing diagram illustrating operation of quality of service information distribution according to an example embodiment.

FIG. 2 is a diagram 200 illustrating operation of quality of service information distribution according to an example embodiment. In the example shown in FIG. 2, mobile station (MS) 202 may be in wireless communication (e.g., via wireless link) with relay station (RS) 204 (RS1), which may be in communication (e.g., via wireless link) with relay station (RS) 206 (RS2), which may be in further communication (e.g., via wireless link) with a base station (BS) 210. For example, a path may be established that that may include MS 202, RS 204, RS 206 and BS 210 to allow MS 202 to communicate with BS 210, for example.

Initially, MS 202 may be associated with BS 210, and may communicate with BS 210 via RSs 204 and 206. BS 210 may be coupled to a network (not shown), such as a wired network, which may be a Local Area Network (LAN), Wide Area Network (WAN), the Internet, or other network. In the example of FIG. 2, four wireless nodes are coupled together, including wireless node 210 (e.g., a BS or AP), wireless nodes 204 and 206 (e.g., relay stations) and a wireless node 202 (e.g., a MS/SS). However, this is merely an example relay network, and any number of relay stations (RSs) may be coupled between a MS and a BS.

Two example embodiments will be briefly described with reference to FIG. 2. In a first embodiment, each RS along the path may perform admission control for the flow and provide an admission control indication to BS 210. BS 210 may then send a QoS reply message admitting the flow at the requested QoS or level of service if, for example, all of the RSs along the path have admitted the flow at the requested QoS. This may be considered a form of distributed admission control since one or more (or even all) of the relay stations (RSs) are involved in the admission control decision. In a second embodiment, RSs along a path may not necessarily perform admission control for the flow, but rather, the BS 210 may perform a centralized admission control for the flow based on a requested QoS request message for the flow (e.g., without input or admission control from the RSs).

According to an example embodiment, a BS may be able to perform a centralized admission control or traffic management for a flow in some cases, since the BS may have information regarding the resource situation at each RS along the path, e.g., based on planning and management. A centralized admission control may also be performed, for example, because all or most the traffic from the RSs will be sent or forwarded to the BS, thereby in some cases providing updated traffic flow information to the BS, according to an example embodiment. However, in other cases the traffic or radio conditions along each link may change more dynamically. In such a case where radio link conditions may change more dynamically, a more distributed admission control may provide quicker adaptation as compared to centralized admission control, although either approach may be used.

As shown in the example of FIG. 2, MS 202 may send a quality of service (QoS) request message 212 to BS 210 via RS 204 and RS 206. In other words, the QoS request message 212 may be transmitted to RS 204, which may then forward the QoS request message 212 to RS 206, which may then forward the QoS request message 212 to BS 210. The hops from MS 202 to BS 210 via RS 204 and RS 206 may be considered a path or communication path, for example.

The QoS request message 212, may be sent from the MS 202 to the first relay station (RS1) 204. The QoS request message 212 may be sent by MS 202 to request a quality of service (QoS) or allocation of network resources for a traffic flow from BS 202. The QoS request message 212 may include a connection identifier or connection ID (CID) to identify a connection, a service flow identifier (SFID) to identify a flow, and one or more QoS parameters identifying a requested (or required) level of service or quality of service (QoS) for the flow.

The QoS parameters may include, for example, any information relating to a service level, a QoS, or a requested allocation of resources. In an example embodiment, the QoS parameters for the requested service level for a flow may include one or more of the parameters included in the IEEE 802.16 Service Flow Encodings (see table 383 of the IEEE 802.16 standard). For example, QoS parameters may include, traffic priority, maximum sustained traffic rate, maximum traffic burst, tolerated jitter, maximum latency, etc., for the flow. Many other types of QoS parameters may be used, such as one or more parameters that may be included as part of an IEEE 802.11 traffic specification (TSPEC), or other parameters. However, these are merely illustrative examples, and the various embodiments are not limited thereto.

In the first example embodiment with respect to FIG. 2, the relay stations 204 and 206 may retrieve or obtain the QoS parameters from the QoS request message 212 upon receiving the QoS request message 212, e.g., prior to forwarding QoS request message 212. Upon a RS receiving a QoS request message 212, the RS may retrieve the QoS parameters for the flow, the SFID and CID from the QoS request message. The RS may then forward the QoS request message to the next hop (e.g., on to the next RS or to the BS if the RS is the last RS in the path).

Relay stations 204 and 206 may then each perform local admission control for the flow based on the requested service level or based on the QoS parameter set for the flow. For example, RSs 204, 206 may each compare the requested QoS (e.g., traffic priority, maximum sustained traffic rate, maximum latency, tolerable jitter, . . . ) for the flow against available network resources at the RS, and may then determine whether sufficient resources at the RS are available to support the requested QoS for the flow. If sufficient resources are available to support or accommodate the requested QoS for the flow (or a portion of the requested QoS), these resources may be reserved by the RS and allocated for the flow, for example.

Each RS 204, 206 may then send an admission control indication (ACI) message 214 to base station 210. ACI message 214 may include, for example an (local with respect to this RS) admission control decision, such as information regarding the ability of the relay station to support or accommodate the requested QoS, among other information. The ACI message 214 may, for example, indicate the QoS for the flow: 1) is not admitted at the RS, 2) is fully admitted at the RS (e.g., sufficient resources were available at the RS and reserved for the flow to meet the requested QoS), or 3) is partially admitted or supported at the RS (e.g., where a level of service is being provided or reserved by the RS which may be less than the QoS or level of service requested for the flow).

The base station 210 may then perform overall admission control for the flow, e.g., based upon the ACI (admission control indication) messages 214 from RSs 204 and 206. BS 210 may then send a QoS reply message 216 back through relay stations 204 and 206 to mobile station 202. The QoS reply message may provide the overall admission control decision for the flow, which may be based upon the admission control indication (ACI) messages 214 from RSs 204, 206. For example, If ACI messages from all RSs 204, 206 indicate that the requested QoS for the flow will be admitted or supported, then the QoS reply may also indicate that the QoS for the flow has been admitted. Likewise, if one or more RSs have rejected the requested QoS or requested service level for the flow (e.g., as indicated by ACI message 214), then the QoS reply message 216 may indicate that the requested flow has been denied or rejected by the BS 210, for example. Also, the QoS reply may grant a QoS or service level that may be less than the requested QoS, e.g., based on one or more ACI messages 214 from RSs 204, 206, etc.

In another example embodiment, upon receiving the QoS reply message, each RS 204, 206 may allocate resources for the flow (if not already allocated), and may schedule the flow.

Also, in an example embodiment, the QoS request message 212, ACI message 214 and QoS reply message 216 may be provided as dynamic service (DSx) messages, such as IEEE 802.16 DSx messages, including a dynamic service add (DSA) message to add a new flow, a dynamic service change (DSC) message to change something regarding a flow, and a dynamic service delete (DSD) message to delete or de-allocate resources for a flow, or delete a flow, as examples.

Also, each of the messages described herein (QoS request message, ACI message, QoS reply message, etc.), may be protected using an authentication code or HMAC. The BS 210 may distribute an authentication key (AK) to allow each RS to receive and verify the authenticity of each message. Thus, for example where RSs 204 and 206 receive a QoS request message that may be protected with an authentication code, the RSs 204, 206 may be able to make be able to verify the authenticity of the QOS request message and use the included QoS parameters to perform admission control based on the QoS request message if the RSs have the associated authentication key (AK) from the BS, for example.

In the second embodiment with respect to FIG. 2, the RSs 204, 206 may not perform (or may not be required to perform) local admission control, and then forward an admission control indication message 214 to BS 210. In such case, BS 210 may perform a centralized admission control (e.g., without input or ACI messages from RSs) and then send a QoS reply message indicating the overall admission control decision for the request QoS for the flow. In such a case, RSs 204, 206 may, in some cases, receive the QoS reply message 216 and may allocate or reserve resources and schedule traffic for the flow based on the admission control decision provided in the QoS reply message 216. The QoS parameters, CID and SFID may be used by the RS for traffic scheduling when the flow is subsequently received. The QoS reply 216 may also be received by the MS 202, indicating that the requested QoS for the flow was or was not granted, for example.

Figure 3:
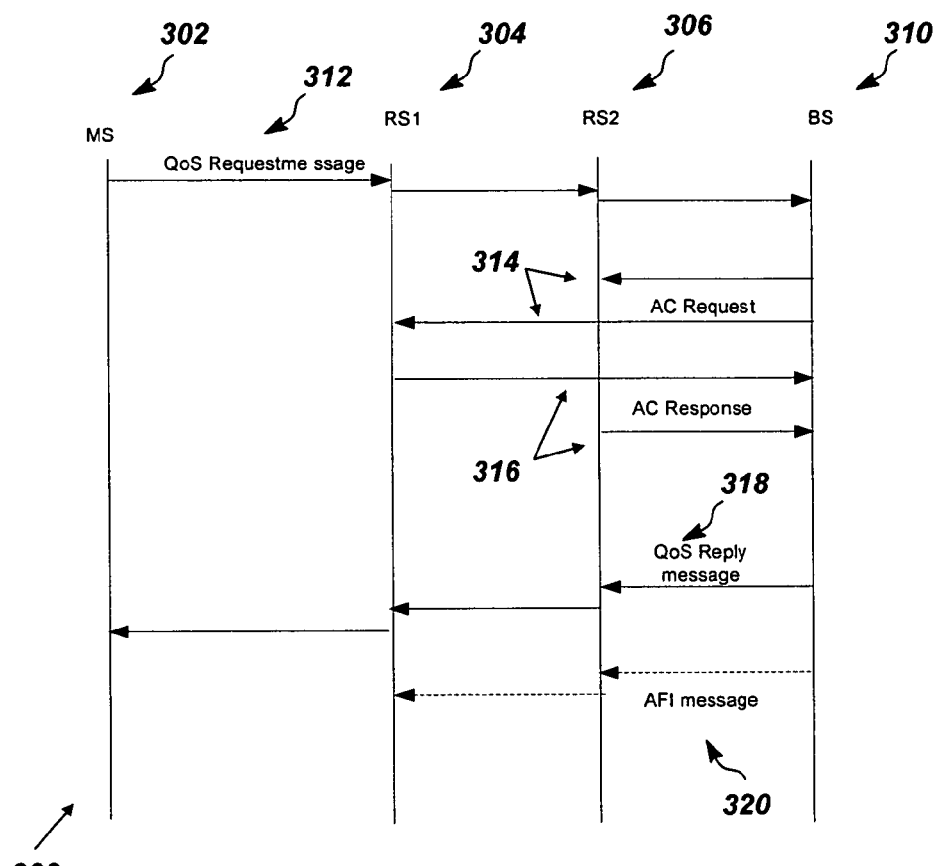
FIG. 3 is a timing diagram illustrating operation of quality of service information distribution according to another example embodiment.

FIG. 3 is a diagram 300 illustrating operation of quality of service information distribution according to another example embodiment. In the example shown in FIG. 3, mobile station (MS) 302 may be in communication with a relay stations 304 and 306 (RS1 and RS2), which may be in further communication with a base station (BS) 310. Initially, mobile station 302 may be associated with base station 310, and may communicate with base station (BS) 310 via relay stations (RSs) 304 and 306.

As shown in this example, a QoS request message 312, may be sent by the MS 302 to the BS 310 via RSs 304 and 306. The QoS request message 312 may include a CID, a SFID and one or more QoS parameters, for example.

In response to receiving the QoS request message 312, the base station (BS) 310 may decide to request one or more or even all of the RSs on the path to assist with admission control decision for the requested flow. Therefore, BS 310 may then send an admission control (AC) request message 314 to (e.g., all) relay stations (RSs) on the path between the BS 310 and MS 302, including RSs 304 and 306. The AC request message 314 may include the SFID, CID and QoS parameters for the requested flow. The AC request message 314 may be used to request each RS along the path to perform admission control for the identified SFID or CID for a specified QoS, and to provide results or decision from such admission control back to the BS 310.

In response to receiving the AC request message 314, each RS 304, 306, may perform (local) admission control for the flow based on the requested QoS or requested service level for the flow. As noted above, this may include, for example, comparing the requested QoS or service level against available resources to determine if sufficient resources are available to accommodate the requested flow. Each RS may then send an admission control (AC) response message 316 to indicate whether the RS has admitted or granted the requested QoS (or portion thereof) for the flow. In one example embodiment, RSs may send an admission control (AC) response message 316 only if the requested flow was denied or rejected admission by the RS, although this is merely one example embodiment.

The base station (BS) 310 may then perform overall admission control for the flow, e.g., based upon the AC response messages 316 from RSs 204 and 206. BS 310 may then send a QoS reply message 318 via relay stations 204 and 206 to mobile station 202. The QoS reply message 318 may provide the overall admission control decision for the flow to MS 302. The admission control decision provided in QoS reply message 318 may be based upon the AC response messages 316 from RSs 304, 306. For example, the QoS reply message may notify MS 302 that the requested QoS have been rejected or denied, admitted, or partially admitted, for example, e.g., depending on the AC response messages 316 from RSs 304, 306 along the path between MS 302 and BS 310.

After admitting a flow from MS 302 with a certain QoS requirement, the BS 310 may send an admitted flow indication (AFI) message 320 to inform all RSs on the path between BS 310 and MS 302 of the identity of the flow and its associated QoS parameters (e.g., CID, SFID, and QoS parameters for the admitted flow). The information provided in the AFI message 320 may be used by each RS to perform scheduling and may be used to determine whether to grant resources to an uplink (e.g., MS to BS) flow or forward its uplink traffic in the case of contention based requests instead of letting the traffic from non-admitted uplink flow be forwarded and then be dropped by the BS 310, for example. Although not shown in FIG. 3, the RSs may send an admitted flow confirmation message to the BS 310 to confirm the reception of the AFI message.

As with the messages of FIG. 2, one or more of the messages described with reference to FIG. 3 may be provided as dynamic service (DSx) messages, such as IEEE 802.16 DSx messages, including a dynamic service add (DSA) message, a dynamic service change (DSC) message, and a dynamic service delete (DSD) message, as examples. Many other types of messages may be used, and the various embodiments may be applicable to a wide variety of wireless networks.

If there is more than one relay station (RS) in the path between the MS and the BS, then several different techniques or formats may be used to send the admission control (AC) request message(s) 314 and/or the admitted flow indication (AFI) message(s).

First, the AC request and/or AFI messages may be sent as a unicast message sent to each of the one or more relay stations on the path between the MS 302 and the BS 310. With this unicast scheme, however, overhead may increase as the number of RS on a path increases since a separate message is sent to each RS.

Second, the AC request and/or AFI messages may be sent as a Z-unicast message addressed to the RS directly attached to the MS. In this example, the message may be sent to the RS 304 that it most directly attached to the MS, allowing the message to be received and read by each RS along the path. This may provide a more efficient technique by transmitting one message that is used or read by all RSs along the path. This may require distribution of the authentication key to all RSs if protection is used, for example. When the message reaches the RS on the path, the RS may verify the authenticity, for example, and retrieve the parameters from the message. If the message is an admission control request message, the RS may perform admission control, and then send an admission control response message to the BS.

Third, the AC request and/or AFI messages may be sent as a multicast message addressed to a multicast group address that includes the addresses (e.g., MAC addresses) of all the RSs in the path between the MS 302 and the BS 310 as multicast group members. When a RS receives the multicast message, for example, every RS in the path (who is a member of the multicast group) may then route the multicast message to the other RSs on the path based on a defined multicast tree, for example. All members of the multicast group may, for example, share a group authentication key.

Figure 4:
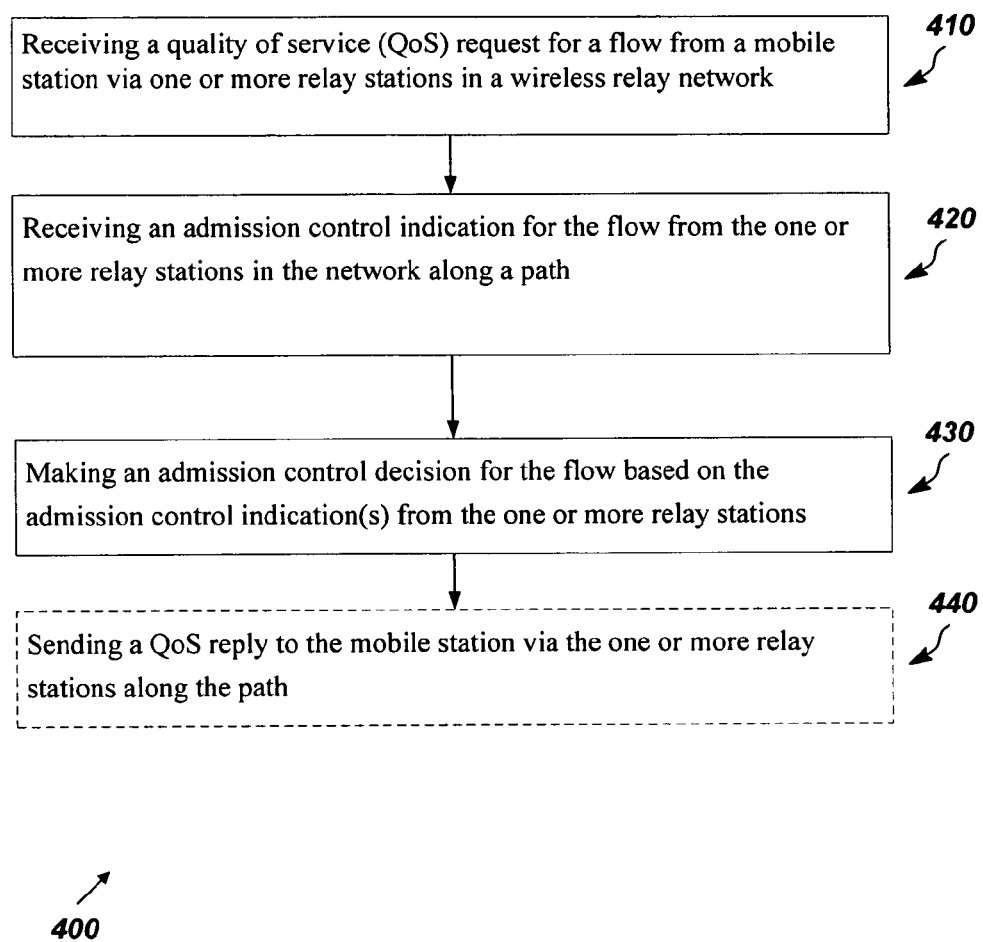
FIG. 4 is a flow chart illustrating quality of service information distribution according to an example embodiment.

FIG. 4 is a flow chart 400 illustrating quality of service information distribution according to an example embodiment. At 410, a quality of service request is received from a mobile station via one or more relay stations in a wireless relay network. The quality of service request may be received at a relay station and/or base station, as an example.

At 420, an admission control indication for the flow from one or more relay stations in the network along a path may be received. One or more relay stations may retrieve QoS parameters from the QoS request. The relay station(s) may then send an admission control indication to a base station. The admission control indication may indicate the relay resources, and/or the ability of the relay station to accommodate the QoS request, among other indications.

At 430, an admission control decision for the flow may be made based on the admission control indication(s) from the one or more relay stations. For example, the base station may accept or grant the requested QoS for the flow if the relay stations on the path are capable of providing the requested QoS. Alternatively, the base station may use or accept a different QoS based on the determination that not all relay stations on the path are capable of achieving the requested QoS, but are capable of supporting a lower QoS, for example.

At 440, optionally, a QoS reply may be sent to the mobile station via the one or more relay stations along the path. The QoS reply may include QoS parameters, which may include an indication of the QoS to be used for the flow, among other parameters. The relay stations along the path may retrieve the QoS parameters including the QoS to be used. This may allow the relay stations to more efficiently allocate resources and better manage information flow.

Figure 5:
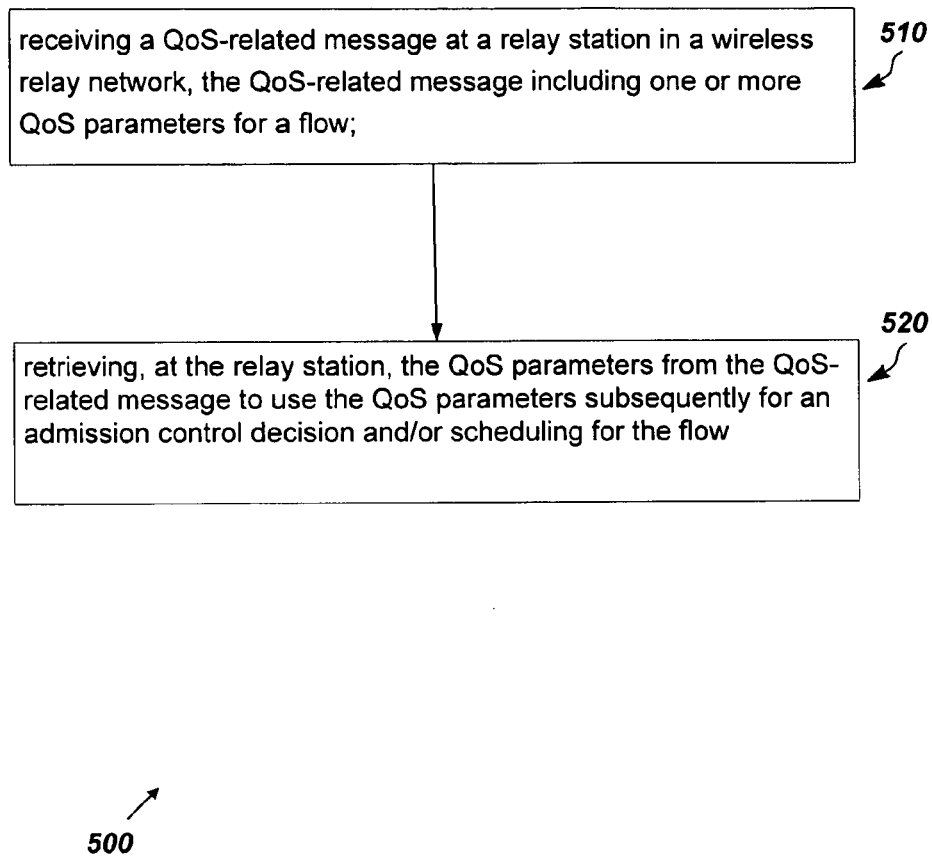
FIG. 5 is a flow chart illustrating quality of service information distribution according to another example embodiment.

FIG. 5 is a flow chart 500 illustrating quality of service distribution according to another example embodiment. At 510, a QoS-related message is received at a relay station in a wireless relay network, where the QoS-related message may include one or more QoS parameters for a flow.

At 520, the relay station may retrieve the QoS parameters from the QoS-related message, e.g., to use the QoS parameters subsequently for an admission control decision and/or scheduling for the flow.

For example, the relay station may receive a QoS request from a mobile station. The relay station may retrieve the QoS parameters from the QoS request and then may then forward the QoS request message to the next hop, such as the next relay station in the path, or to the base station if the receiving relay station is the last relay station in the path, for example.

Figure 6:
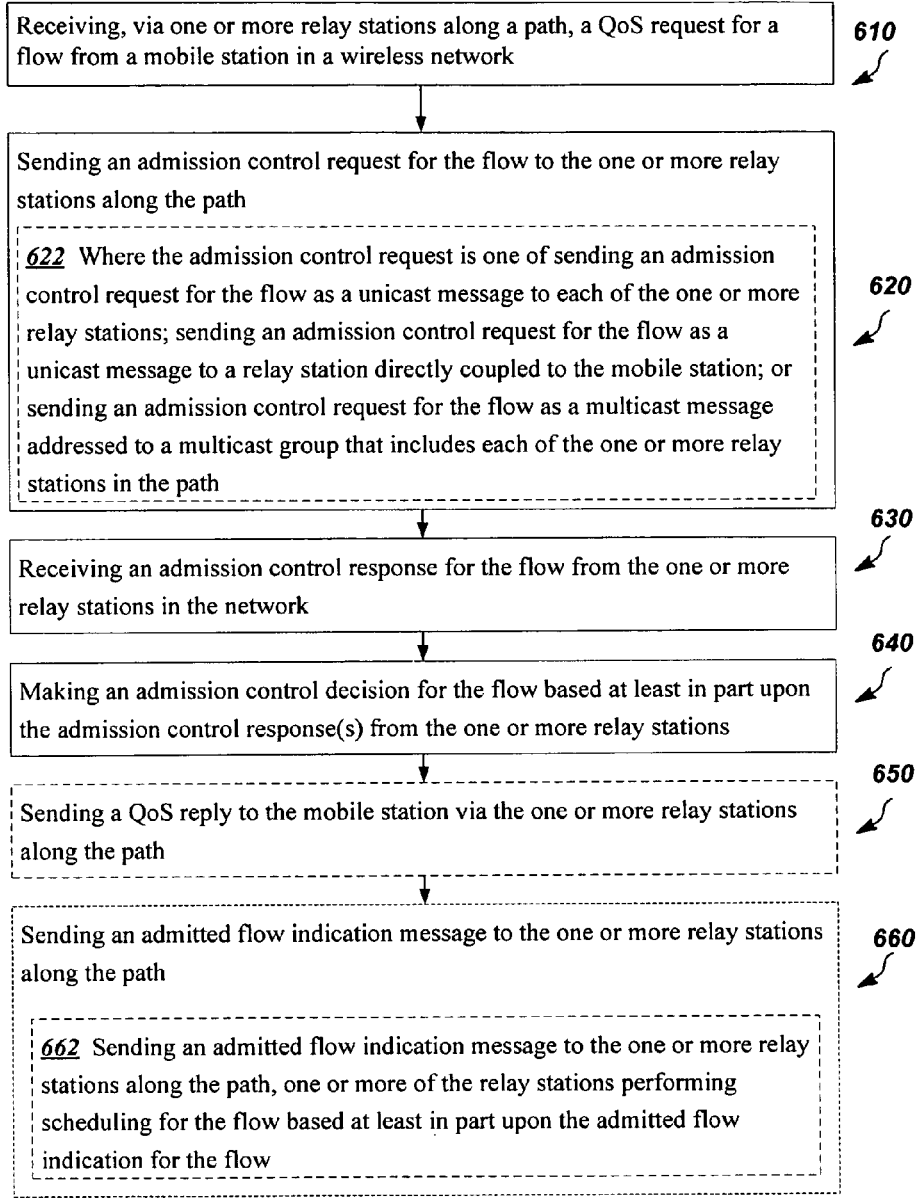
FIG. 6 is a flow chart illustrating quality of service information distribution according to yet another example embodiment.

FIG. 6 is a flow chart 600 illustrating quality of service distribution according to yet another example embodiment. At 610, a QoS request may be received from a mobile station in a wireless network for a flow. The QoS request may, for example, be received via one or more relay stations along a path. The QoS request may be received by relay station(s) and/or by a base station.

At 620, an admission control request for the flow may be sent to one or more relay stations along the path. Optionally, at 622, the admission control request may include one of sending an admission control request for the flow as a unicast message to each of the one or more relay stations; sending an admission control request for the flow as a unicast message to the relay station directly coupled to the mobile station; or sending an admission control request for the flow as a multicast message addressed to a multicast group that includes each of the one or more relay stations. Other message types may be used for the admission control request, for example.

The base station may send an admission control request to the relay station(s) to determine is the relay station(s) have the capability and/or resources to support the requested QoS. The relay station(s) may receive the QoS parameters from the QoS request, and/or from the admission control request.

At 630, an admission control response may be received from the one or more relay stations in the network. The admission control response may include an indication (or local admission control decision) that the relay station has sufficient resources, or not, to accommodate the requested QoS, for the flow, for example.

At 640, optionally, an admission control decision for the flow may be made, e.g., by the base station, based at least in part upon the admission control responses(s) from the one or more relay stations.

At 650, optionally, a QoS reply may be sent to the mobile station via the one or more relay stations along the path. The QoS reply may include QoS parameters and other information regarding the flow.

At 660, optionally, an admitted flow indication message may be sent to the one or more relay stations along the path. This may allow the relay station(s) optionally to manage resources and flow based at least in part upon the admitted flow indication for the flow, at 662.

Figure 7:
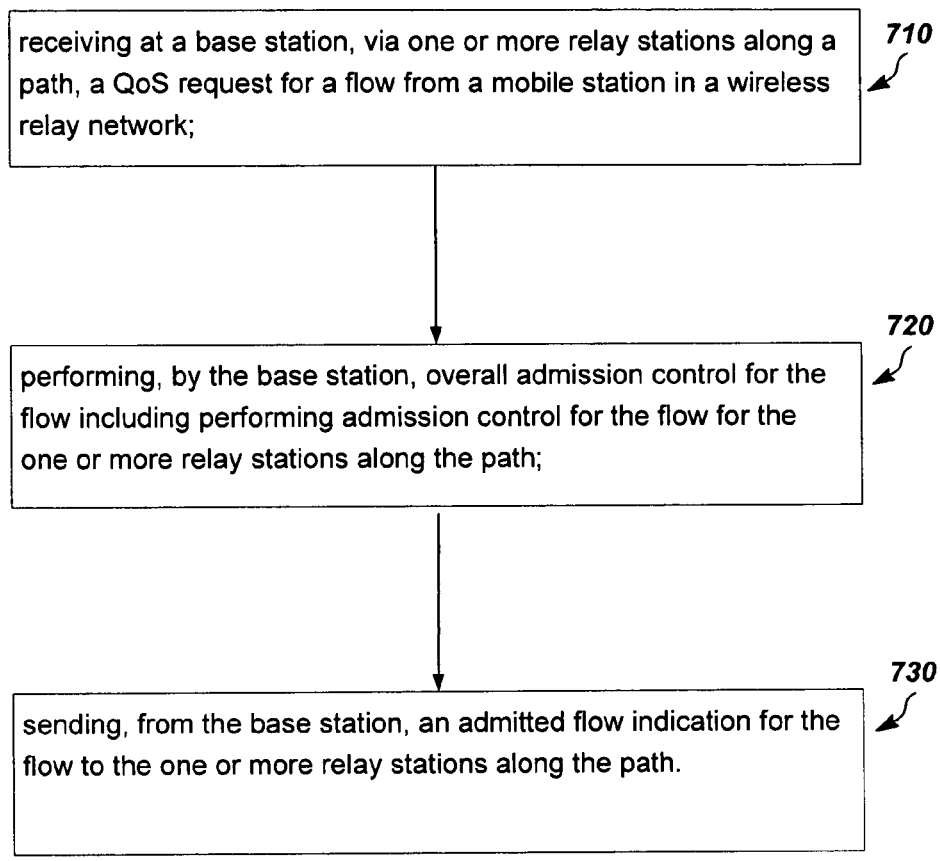
FIG. 7 is a flow chart illustrating quality of service information distribution according to yet another example embodiment.

FIG. 7 is a flow chart illustrating quality of service distribution according to yet another example embodiment.

At 710, a QoS request for a flow may be received at a base station, via one or more relay stations along a path in a wireless relay network. The QoS request may be received from a mobile station.

At 720, the base station may perform overall admission control for the flow including performing admission control for the flow for the one or more relay stations along the path.

At 730, the base station may send an admitted flow indication for the flow to the one or more relay stations along the path.

Figure 8:
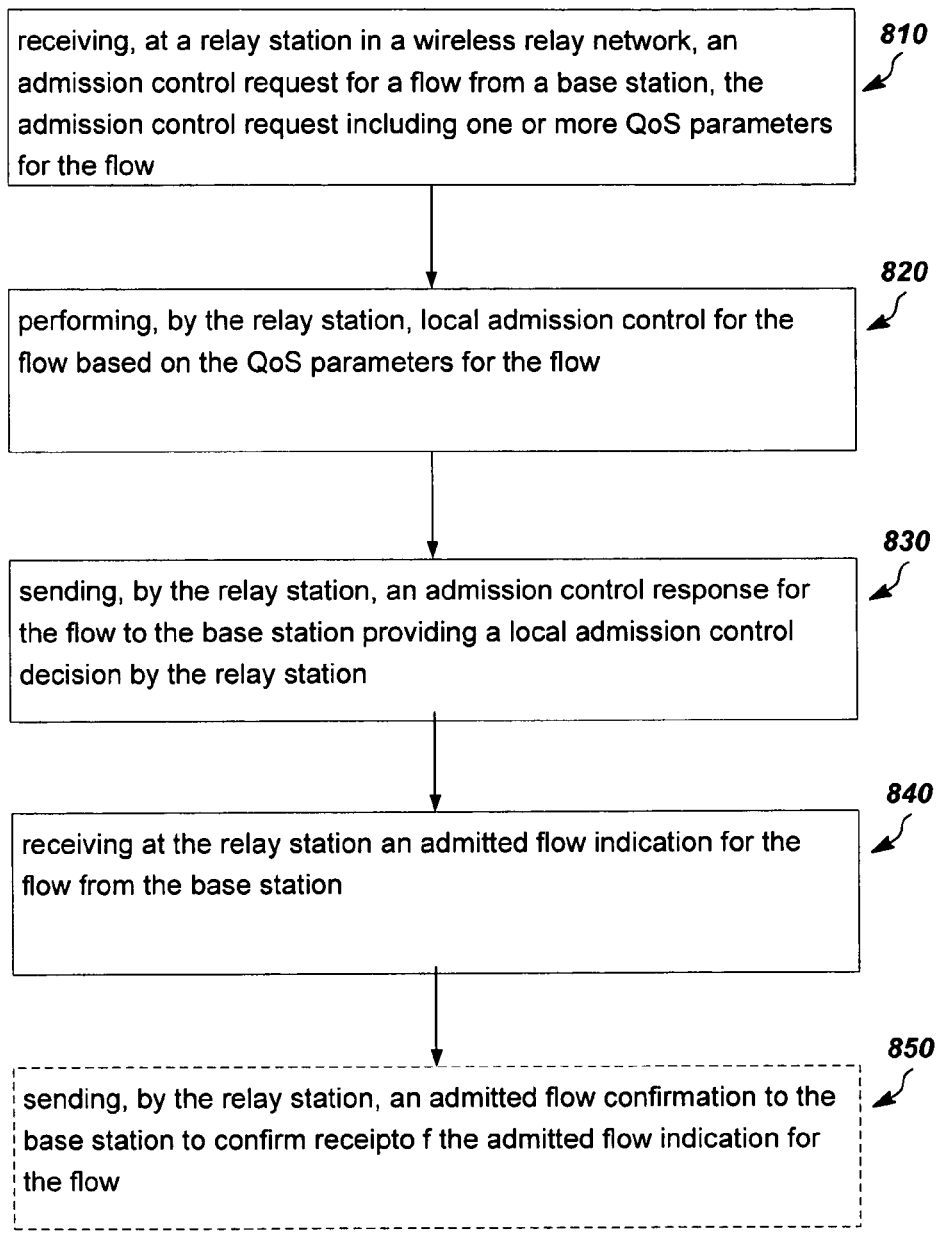
FIG. 8 is a flow chart illustrating quality of service information distribution according to another example embodiment.

FIG. 8 is a flow chart illustrating quality of service distribution according to yet another example embodiment.

At 810, a relay station in a wireless relay network may receive an admission control request for a flow from a base station. The admission control request may include one or more QoS parameters for the flow.

At 820, the relay station may perform local admission control for the flow based on the QoS parameters for the flow.

At 830, the relay station may send an admission control response for the flow to the base station providing a local admission control decision by the relay station for the flow.

At 840, the relay station may receive an admitted flow indication for the flow from the base station. The relay station may perform scheduling for the flow based on the admitted flow indication, for example.

At 850, which may be optional in an example embodiment, the relay station may send an admitted flow confirmation to the base station to confirm receipt of the admitted flow indication for the flow.

Figure 9:
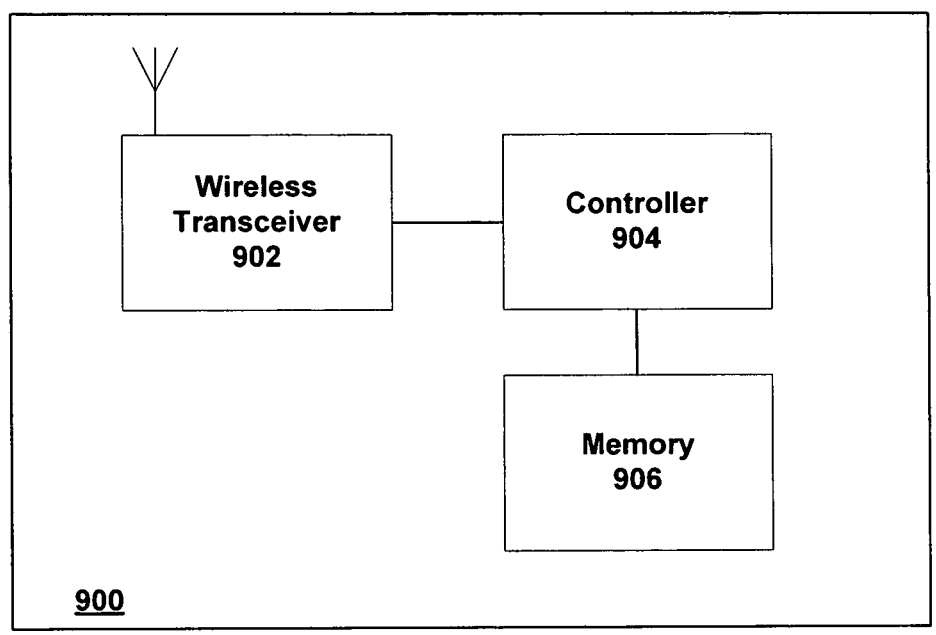
FIG. 9 is a block diagram illustrating an apparatus that may be provided in a wireless node according to an example embodiment.

FIG. 9 is a block diagram illustrating an apparatus 900 that may be provided in a wireless node according to an example embodiment. The example wireless node may include, for example, a wireless transceiver 902 to transmit and receive signals, a controller 904 to control operation of the station and execute instructions or software, and a memory 906 to store data and/or instructions. Controller 904 may be programmable, and capable of executing software or other instructions stored in memory or on other computer media to perform the various tasks and functions described above, such as to perform various tasks or operate as described in any of FIGS. 1-8 for example.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, for example, hardware or special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
receiving, by a base station, a quality of service (QoS) request for a flow from a mobile station via one or more relay stations in a wireless relay network, the QoS request including one or more of traffic priority, maximum sustained traffic rate, maximum traffic burst, tolerated jitter, and maximum latency;
in response to receiving the QoS request, the base station sending an admission control (AC) request message to request an AC decision from the one or more relay stations;
receiving, by the base station, an AC response for the flow to either admit or reject the flow based on the QoS request from the one or more relay stations in the network along a path; and
making, by the base station, an admission control decision for the flow to either admit or reject the flow based at least in part upon the AC response(s) from the one or more relay stations,
wherein the QoS request includes a service flow identifier (SFID) to identify an associated service flow and one or more QoS parameters identifying a requested QoS for the associated service flow.

2. The method of claim 1 and further comprising sending a QoS reply to the mobile station via the one or more relay stations along the path based at least in part on the AC response(s).

3. A method comprising:
receiving a QoS-related message at a relay station in a wireless relay network, the QoS-related message including one or more QoS parameters for a service flow, the QoS parameters including one or more of traffic priority, maximum sustained traffic rate, maximum traffic burst, tolerated jitter, and maximum latency;
forwarding the QoS-related message to a base station;
receiving, from a base station, a request for an admission control (AC) decision;
in response to receiving the request for the AC decision, retrieving the QoS parameters from the QoS-related message to use the QoS parameters subsequently for an admission control decision and/or scheduling for the flow;
comparing the QoS parameters against available resources to determine if sufficient resources are available to accommodate the service flow; and
sending an AC response to the base station indicating whether to admit or reject the service flow based on the comparing the QoS parameters,
wherein the QoS-related message includes a service flow identifier (SFID) to identify the service flow.

4. The method of claim 3 wherein receiving a QoS-related message comprises receiving, at the relay station, a QoS request for a flow from a mobile station.

5. The method of claim 3 and further comprising scheduling the flow, by the relay station, based on the retrieved QoS parameters.

6. A method comprising:
receiving by a base station, via one or more relay stations along a path, a QoS request for a service flow from a mobile station in a wireless network, the QoS request including one or more of traffic priority, maximum sustained traffic rate, maximum traffic burst, tolerated jitter, and maximum latency;
sending, by the base station, an admission control request for the flow to the one or more relay stations along the path;
receiving, by the base station, an admission control response for the flow from the one or more relay stations in the network, the admission control response indicating to either admit or deny the QoS request; and
making, by the base station, an admission control decision for the flow to either admit or deny the requested service flow based at least in part upon the admission control response(s) from the one or more relay stations,
wherein the QoS request includes a service flow identifier (SFID) to identify the service flow.

7. The method of claim 6 wherein the sending an admission control request comprises sending an admission control request for the flow as a unicast message directed to a relay station that is directly coupled to the mobile station, the admission control request including one or more QoS parameters for the flow.

8. The method of claim 7 and further comprising:
one or more of the relay stations along the path retrieving the QoS parameters from the admission control request;
performing local admission control for the flow by each of the one or more relay stations along the path based on the QoS parameters;
sending an admission control response to a base station based on the performing local admission control.

9. The method of claim 6 wherein the sending an admission control request comprises at least one of:
sending an admission control request for the flow as a unicast message to each of the one or more relay stations;
sending an admission control request for the flow as a unicast message to a relay station directly coupled to the mobile station; or
sending an admission control request for the flow as a multicast message addressed to a multicast group that includes each of the one or more relay stations.

10. The method of claim 6 and further comprising sending a QoS reply to the mobile station via the one or more relay stations along the path.

11. The method of claim 6 and further comprising sending an admitted flow indication to the one or more relay stations along the path.

12. The method of claim 11 wherein the sending an admitted flow indication comprises sending an admitted flow indication for the flow as a unicast message directed to a relay station that is directly coupled to the mobile station, the admitted flow indication including one or more QoS parameters for the flow.

13. The method of claim 12 and further comprising:
one or more of the relay stations along the path retrieving the QoS parameters from the admitted flow indication;
performing scheduling for the flow by each of the one or more relay stations along the path based on the QoS parameters;
sending an admitted flow confirmation to a base station.

14. The method of claim 11 wherein the sending an admitted flow indication comprises:
sending an admitted flow indication message to the one or more relay stations along the path, one or more of the relay stations performing scheduling for the flow based at least in part upon the admitted flow indication for the flow.

15. The method of claim 11 wherein the sending an admitted flow indication message comprises at least one of:
sending an admitted flow indication message for the flow as a unicast message to each of the one or more relay stations;
sending an admitted flow indication message for the flow as a unicast message to a relay station directly coupled to the mobile station; or
sending an admitted flow indication message for the flow as a multicast message addressed to a multicast group that includes each of the one or more relay stations.

16. A method comprising:
receiving at a base station, via one or more relay stations along a path, a QoS request for a service flow from a mobile station in a wireless relay network, the QoS request including one or more of traffic priority, maximum sustained traffic rate, maximum traffic burst, tolerated jitter, and maximum latency;
performing, by the base station, overall admission control for the flow including either granting or rejecting the flow for the one or more relay stations along the path;
sending, from the base station, an admitted or rejected flow indication for the flow to the one or more relay stations along the path,
wherein the QoS request includes a service flow identifier (SFID) to identify the service flow and one or more QoS parameters identifying a requested QoS for the service flow.

17. The method of claim 16 wherein the performing, by the base station, overall admission control for the flow comprises performing centralized admission control for the flow for the one or one or more relay stations along the path without receiving local admission control information from the one or more of the relay stations along the path.

18. The method of claim 16 wherein the performing, by the base station, overall admission control for the flow comprises:
sending an admission control request for the flow to each of the one or more relay stations along the path;
receiving an admission control response for the flow from the one or more relay stations providing a local admission control decision for the flow, the admission control response indicating whether the one or more relay stations grants or rejects the requested flow;
performing, by the base station, admission control for the flow based on the admission control response(s).

19. A method comprising:
receiving, at a relay station in a wireless relay network, an admission control request for a service flow from a base station, the admission control request including one or more QoS parameters for the flow, the QoS parameters including one or more of traffic priority, maximum sustained traffic rate, maximum traffic burst, tolerated jitter, and maximum latency;
performing, by the relay station, local admission control for the flow based on the QoS parameters for the flow; and
sending, by the relay station, an admission control response for the flow to the base station indicating to either admit or reject the requested service flow based on the performed local admission control;
receiving at the relay station an admitted flow indication for the flow from the base station,
wherein the admission control request includes a service flow identifier (SFID) to identify the service flow.

20. The method of claim 19 and further comprising sending, by the relay station, an admitted or rejected flow confirmation to the base station.

21. An apparatus for wireless communication, the apparatus comprising:
a controller;
a memory coupled to the controller; and
a wireless transceiver coupled to the controller;
the apparatus adapted to:
receive a QoS-related message at a relay station in a wireless relay network, the QoS-related message including one or more QoS parameters for a service flow, the QoS request including one or more of traffic priority, maximum sustained traffic rate, maximum traffic burst, tolerated jitter, and maximum latency;
forward the QoS-related message to a base station;
receive, from the base station, a request for an admission control (AC) decision;
in response to receiving the request for the AC decision, retrieve, at the relay station, the QoS parameters from the QoS-related message to use the QoS parameters subsequently for an admission control decision and/or scheduling for the flow,
compare the QoS parameters against available resources to determine if sufficient resources are available to accommodate the service flow; and
send an admission control message indicating whether to admit or reject the service flow based on the comparing the QoS parameters,
wherein the QoS-related message includes a service flow identifier (SFID) to identify the service flow.

22. An apparatus for wireless communication, the apparatus comprising:
a controller;
a memory coupled to the controller; and
a wireless transceiver coupled to the controller;
the apparatus adapted to:
receive, at a relay station in a wireless relay network, an admission control request for a service flow from a base station, the admission control request including one or more QoS parameters for the flow, the QoS parameters including one or more of traffic priority, maximum sustained traffic rate, maximum traffic burst, tolerated jitter, and maximum latency;
perform, by the relay station, local admission control for the flow based on the QoS parameters for the flow; and
send, by the relay station, an admission control response for the flow to the base station indicating to either grant or deny the requested service flow based on the performed local admission control; and
receive at the relay station an admitted flow indication for the flow from the base station,
wherein the admission control request includes a service flow identifier (SFID) to identify the service flow.

23. The method of claim 1, wherein the method is performed by an IEEE 802.16 base station.

24. The method of claim 6, wherein the method is performed by an IEEE 802.16 base station.

25. The method of claim 1, wherein the QoS request includes traffic priority.

26. The method of claim 1, wherein the QoS request includes maximum sustained traffic rate.

27. The method of claim 1, wherein the QoS request includes maximum traffic burst.

28. The method of claim 1, wherein the QoS request includes tolerated jitter.

29. The method of claim 1, wherein the QoS request includes maximum latency.

30. The method of claim 16, wherein the performing overall admission control includes either granting or rejecting the flow for the one or more relay stations along the path based on the QoS request.

* * * * *